United States Patent [19]

Skubic

[11] 4,040,228
[45] Aug. 9, 1977

[54] MOUNTING MEANS

[75] Inventor: Leroy F. Skubic, La Porte, Ind.

[73] Assignee: The Paltior Corporation, Michigan City, Ind.

[21] Appl. No.: 657,681

[22] Filed: Feb. 12, 1976

[51] Int. Cl.² .......................... E04B 1/38; E06B 1/16; F16B 1/00

[52] U.S. Cl. ....................... 52/710; 49/468; 151/7

[58] Field of Search ............... 52/710, 717; 49/468; 248/23; 403/21, 22, 23, 754, 755, 758 C, 758 F; 151/7

[56] References Cited

U.S. PATENT DOCUMENTS

| 1,245,414 | 11/1917 | Widmer | 52/710 |
|---|---|---|---|
| 1,430,931 | 10/1922 | Blackall | 52/710 |
| 1,930,314 | 10/1933 | Healy et al. | 52/710 |
| 2,144,350 | 1/1939 | Swanstrom | 151/7 |
| 3,235,917 | 2/1966 | Skubic | 49/468 |
| 3,449,883 | 6/1969 | Skubic et al. | 52/710 |

Primary Examiner—James L. Ridgill, Jr.

[57] ABSTRACT

A channel member having its flanges extending at an acute angle to the web and having inturned margins on the free edges of the flanges is imbedded in plastic concrete in approximately the position of a threshold plate or other structure to be mounted, the set concrete retaining the mounting channel in fixed position by the dovetailed relation of the flanges in the concrete with the open top of the mounting channel substantially flush with the concrete to also serve as a screed guide for the plastic concrete; a plurality of spanner bars of channel shape and of a length greater than the spacing of the flanges of the mounting channel are provided with slots which extend the full distance between the free edges of the inturned margins with a square lock nut such as the type having a nylon strip in a keyway is slidably positioned in each spanner bar channel and a flat head or oval head mounting screw for the threshold extends through corresponding countersunk apertures in the threshold and threaded into the square lock nut. The spanner bars are attachable to the threshold with the screws and nuts and arranged substantially longitudinally along the threshold; the threshold is then placed in position with the spanner bars falling into the mounting channel cavity and the threshold is accurately positioned for cooperation with the door with which it is used and the machine screws are turned with a screw driver causing the spanner bars to first rotate with the lock nut until rotation of the spanner bars is stopped when the ends of the spanner bars underly the inturned margins by engagement with the flanges of the mounting channel, each spaner bar sliding on its cooperating nut to the correct position corresponding with the selected accurate position desired for the threshold and further tightening of the machine screws clamp the threshold permanently in place, the threshold plate being removable by rotating the screws in the opposite direction.

5 Claims, 9 Drawing Figures

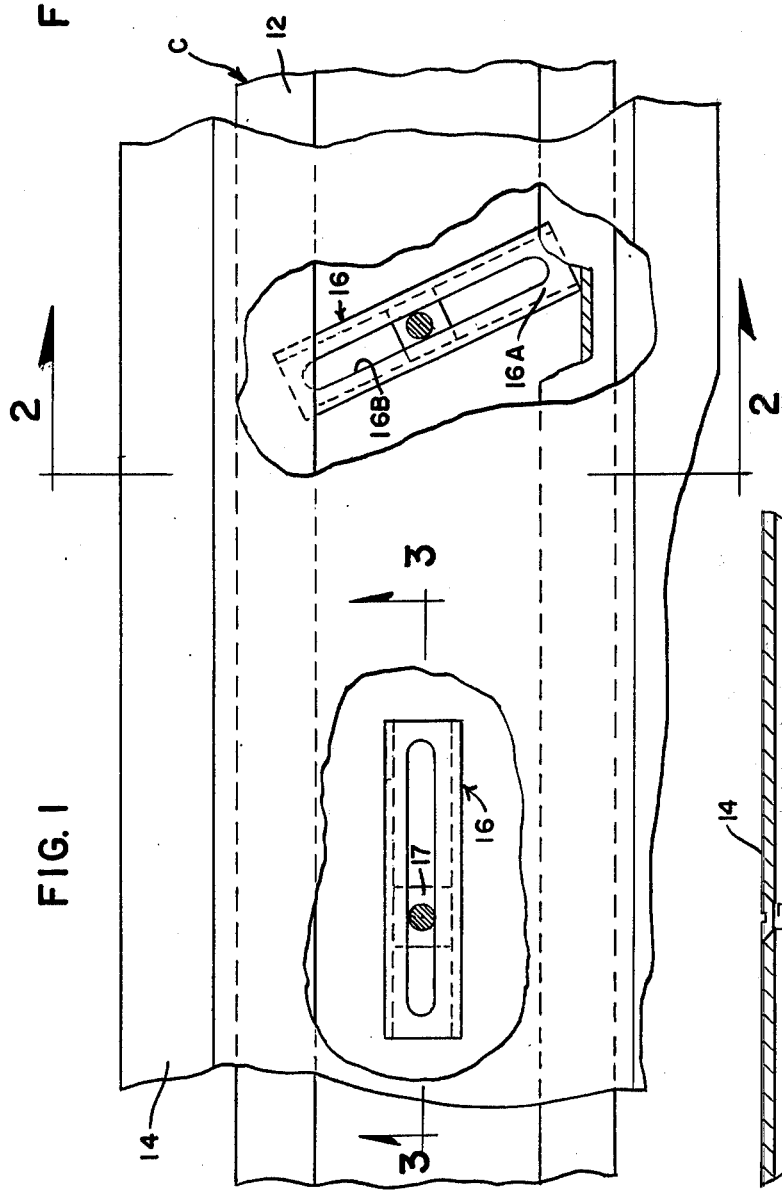
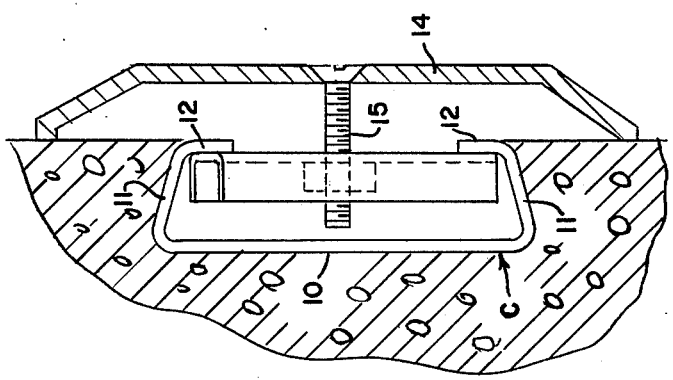
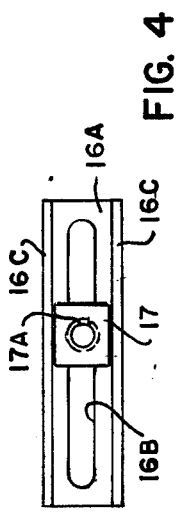
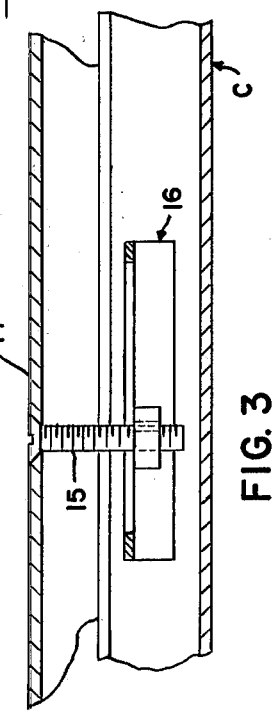

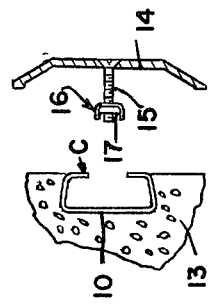
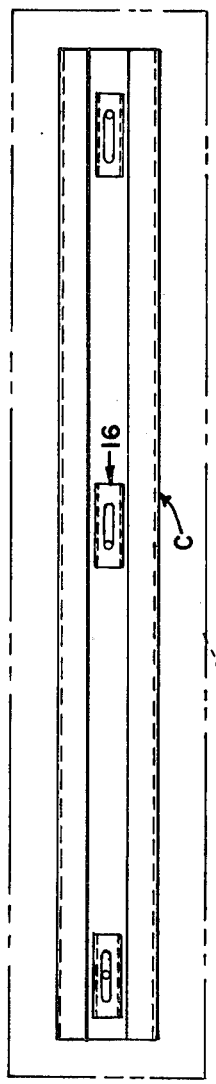
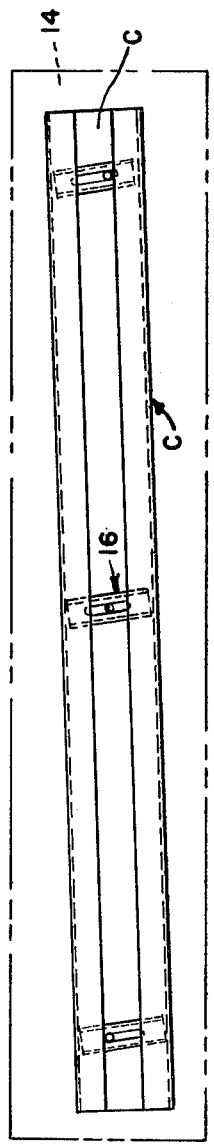
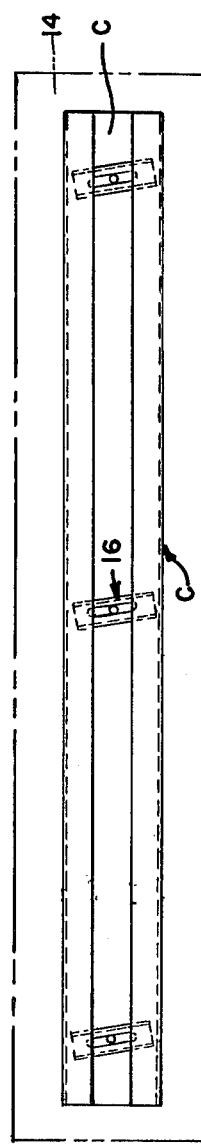
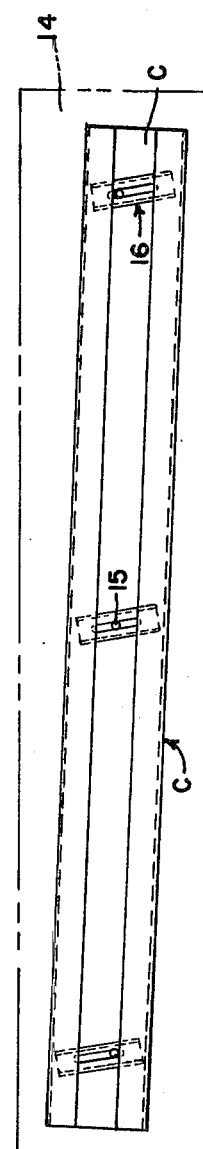
FIG. 6
FIG. 5  FIG. 7  FIG. 8  FIG. 9

MOUNTING MEANS

The present invention relates to mounting thresholds or the like as described in Skubic U.S. Pat. Nos. 3,235,917 and 3,449,883, and the present invention is an improvement thereover.

Prior to the present invention and the prior Skubic patents thresholds were mounted by drilling holes in concrete and inserting lead plugs and expansion type nuts but it was extremely difficult to get the lead plugs and the expansion type nuts in accurate position and accordingly the thresholds were seldom located in the best position for weather tightness and smooth operation of the doors and for aesthetic appearance and the present invention provides an improved way of obtaining this advantageous mounting of thresholds and other structural elements in accurate positions.

An object of the present invention is to provide a simple structure making use of readily available elements for mounting parts of buildings or other structures in their correct positions.

Another object is to provide a mounting means for accurately centering a long strip with many screws receiving openings such as a threshold in correct position even though the supporting structure therefor is inaccurately located.

Other and further objects will be apparent as the description proceeds and upon reference to the accompanying drawings wherein:

FIG. 1 is a plan view of a fragment of a threshold and an upwardly opening mounting channel of trapezoidal section having inturned margins with a plurality of channel shape spanner bars of a length greater than the spacing between the flanges of the mounting channel with a screw receiving slot extending lengthwise of each spanner bar with a square lock nut in each spanner bar and a machine screw passing through the mounting opening of the threshold and showing one spanner bar in operative position and the other spanner bar in initial position ready for turning into clamping relation.

FIG. 2 is a section taken along line 2—2 of FIG. 1 showing the clamping spanner bar in its operative position.

FIG. 3 is a fragmentary section taken on line 3—3 of FIG. 1 showing the spanner bar just prior to engagement with the flanges and the inturned margins of the mounting channel.

FIG. 4 is a bottom view of a spanner bar showing the square lock nut with the nylon insert in a keyway therein projecting into the space occupied by the machine screw.

FIG. 5 is a plan view of a threshold in phantom lines and the mounting channel and spanner bars in full lines and in longitudinal alignment and suspended from the machine screws just prior to the insertion of the spanner bars in the channel.

FIG. 6 is an end view of the threshold of FIG. 5 on a reduced scale with the spanner bars shown in end elevation and ready to be inserted into the mounting channel.

FIGS. 7, 8, and 9, are plan views on the same reduced scale similar to FIG. 5 but showing the spanner bars in clamped relation with the threshold shown in phantom connected by clockwise and lateral displacement in FIG. 7, in parallel relation in FIG. 8 and in counterclockwise and lateral displacement in FIG. 9.

Referring more specifically to the drawings, a mounting channel C of steel or the like has a web 10 with flanges 11, 11 extending at an acute angle and having inturned margins 12, 12 projecting from the free edges of the flanges with the channel imbedded in a concrete slab 13 by placement in the plastic concrete positioned in the approximately correct location for the threshold of the doorway. A conventional threshold 14 is provided with countersunk apertures substantially centrally thereof which receive slotted head machine screws 15 of a length to pass through the mounting aperture of the threshold and into the mounting channel but terminating short of web 10.

Spanner bars 16 of open channel shape include a web 16 having an elongated slot 16B of a length to extend to and preferably past the free edges of the inturned margins 12. The side flanges 16C are spaced apart a sufficient distance to a snuggly and slideably receive a square lock nut 17 such as the type having a nylon strip 17a provided in a keyway formed in the nut so that substantial resistance is involved to turn the cooperating screw 15 so the nut will normally rotate with the screw 15 and cause rotation of the channel-shaped spanner bar to move from a position longitudinally of the threshold as shown to the left in FIG. 1 to the locking position shown at the right in FIG. 1 and the positions of FIGS. 7, 8, and 9 where the ends of the spanner bar engage the sloping flanges of the mounting channel.

Each spanner bar is of greater length than the distance between the flanges 11, 11 so the spanner bar cannot rotate through 360° and the spanner bar acts as a wrench holding the square lock nut against turning. The initial turning of the screw 15 causes the ends of the spanner bar 16 to pass under the inturned margins 12, 12 of the mounting channel to the position shown at the right in FIG. 1 and shown in end elevation in FIG. 2 and further tightening of the screw causes the spanner bar 16 to be drawn into tight contact with the under surfaces of the inturned margins 12, 12 thereby clamping the threshold 14 securely onto the concrete support 13 by the reaction of the screw and nut on the channel and the retaining action of the dovetail connection between the mounting channel and the concrete 13. However, other appendages can be applied in a manner similar to that shown in the above mentioned Skubic patents to additionally secure the mounting channel and the mounting channel may be secured to wood floors or the like by screws passing through apertures in the web of the mounting channel.

It will be apparent that applicant has provided an effective positive, simple adjustable mounting structure to secure thresholds or the like to a support and that various changes may be made within the spirit of the invention as defined by the valid scope of the claims.

What is claimed is:

1. A mounting means for a plate such as a threshold having screw receiving apertures in accurately predetermined position comprising an upwardly opening mounting channel member having a web and side flanges extending at an angle to the web, an inturned margin extending along each flange, a downwardly opening channel shaped spanner bar of slightly greater length than the distance between the flanges of said mounting channel member, said channel shaped spanner bar having parallel flanges and being free of obstructions and of uniform dimensions between its flanges, said spanner bar having a screw receiving slot centrally of said web thereof and of a length to span the free edges of the inturned margins of the mounting channel opening, and a nut having parallel enlongated edges slidably and non-rotatably received in the downwardly opening channel of said spanner bar to prevent relative rotation between said nut and said spanner bar channel while permitting relative sliding between said spanner bar and said nut, and a bindingly fitting screw extending through an aperture in said plate and through said slot in said spanner bar and threaded into said nut, said screw being secureable through said plate such as a threshold to be secured to said mounting channel, whereby the assembled threshold plate and spannar bar and nut and screw with the spanner bar in axial alignment with the channel opening of the channel mounting member can be positioned so the nut and spanner bar lie below the inturned margins so the first turning of the screw will cause the ends of the spanner bar to underlie the inturned margins of the mounting member as the spanner bar may slide on the nut whereby the ends of the spanner bar engage the flanges of said mounting channel member with a camming action so each end of the spanner bar may engage the adjacent flange of the mounting channel member and underlie the adjacent inturned margin of the channel member and further rotation of the screw positively rotates the screw relative to the nut and spanner bar and the nut and spanner bar are thereby moved along the screw and the arrangement clamps the plate such as a threshold when the ends of the spanner bar abut the undersurface of the inturned margins and the plate is secured in the accurately adjusted desired predetermined position to the support by the reaction of the spanner bar, screw, and nut with the mounting channel member.

2. The invention according to claim 1 in which there are a plurality of apertures in the plate and a plurality of assemblies of screw, nut and channel shaped spanner bars which are secured to the plate by the cooperating screws.

3. The invention according to claim 1 in which the nut has a friction insert to provide the binding action.

4. The invention according to claim 1 in which a threshold having a plurality of screw receiving openings is provided with screws and spanner bars and nuts to secure the threshold throughout its length to the support.

5. The invention according to claim 1 in which the flanges of the mounting channel are at an acute angle to the web.

* * * * *